US009091208B2

(12) United States Patent
Petitjean et al.

(10) Patent No.: US 9,091,208 B2
(45) Date of Patent: Jul. 28, 2015

(54) TURBOCHARGER BEARING HOUSING ASSEMBLY

(75) Inventors: Dominique Petitjean, Julienrupt (FR); Guillaume Dupont, Thaon les Vosges (FR); Anthony Ruquart, Epinal (FR); Philippe Arnold, Hennecourt (FR)

(73) Assignee: Honeywell International Inc., Morristown, NJ (US)

( * ) Notice: Subject to any disclaimer, the term of this patent is extended or adjusted under 35 U.S.C. 154(b) by 1323 days.

(21) Appl. No.: 12/838,317

(22) Filed: Jul. 16, 2010

(65) Prior Publication Data

US 2012/0014782 A1    Jan. 19, 2012

(51) Int. Cl.
| | |
|---|---|
| *F01D 5/08* | (2006.01) |
| *F01D 25/16* | (2006.01) |
| *F02C 6/12* | (2006.01) |
| *F01D 25/14* | (2006.01) |
| *F01D 25/18* | (2006.01) |

(52) U.S. Cl.
CPC . *F02C 6/12* (2013.01); *F01D 25/14* (2013.01); *F01D 25/16* (2013.01); *F01D 25/18* (2013.01); *F05D 2220/40* (2013.01); *F05D 2260/20* (2013.01)

(58) Field of Classification Search
CPC ....... F01D 25/08; F01D 12/125; F01D 12/14; F01D 12/145; F01D 12/18; F01D 12/24; F04D 29/061; F04D 29/063
USPC .................. 415/175–180, 116; 417/407, 373; 165/80.4, 141, 154, 155; 123/41.31, 123/41.44, 198 E; 60/605.3
See application file for complete search history.

(56) References Cited

U.S. PATENT DOCUMENTS

| | | | | |
|---|---|---|---|---|
| 3,811,741 | A | * | 5/1974 | McInerney et al. ........... 384/291 |
| 4,655,043 | A | | 4/1987 | McInerney |
| 4,907,952 | A | * | 3/1990 | Inoue et al. ................... 417/407 |
| 4,930,460 | A | * | 6/1990 | Aihara et al. .............. 123/41.49 |
| 4,969,805 | A | * | 11/1990 | Romeo ......................... 417/360 |
| 5,554,343 | A | * | 9/1996 | Wade ............................ 422/177 |

(Continued)

FOREIGN PATENT DOCUMENTS

| | | |
|---|---|---|
| EP | 834646 A1 | 4/1998 |
| EP | 1445448 A1 | 8/2004 |

(Continued)

OTHER PUBLICATIONS

JP 3489332 (Nishizawa et al.)Translated Description.*

(Continued)

*Primary Examiner* — Igor Kershteyn
(74) *Attorney, Agent, or Firm* — Brian J. Pangrle

(57) ABSTRACT

An assembly for a turbocharger that includes a bearing housing with a cylindrical portion with a bore configured for receipt of a bearing, an extension that extends radially outwardly from the cylindrical portion to a base, the base configured with one or more features for securing the bearing housing to another component, a compressor fitting, a turbine fitting, and lubricant flow paths; and a fluid jacket that includes a cylindrical wall configured for placement over at least a portion of the cylindrical portion of the bearing housing where the cylindrical wall includes a recess configured to accommodate at least a portion of the extension of the bearing housing, a fluid inlet, and a fluid outlet. Various other examples of devices, assemblies, systems, methods, etc., are also disclosed.

20 Claims, 11 Drawing Sheets

(56) References Cited

U.S. PATENT DOCUMENTS

| | | | |
|---|---|---|---|
| 6,035,637 A * | 3/2000 | Beale et al. ............... | 60/595 |
| 6,951,450 B1 | 10/2005 | Figura et al. | |
| 7,108,488 B2 * | 9/2006 | Larue et al. ............... | 417/407 |
| 2005/0199509 A1 * | 9/2005 | Ross ............................ | 205/633 |
| 2010/0175377 A1 * | 7/2010 | Hippen et al. ............. | 60/602 |
| 2011/0008158 A1 | 1/2011 | Boening | |

FOREIGN PATENT DOCUMENTS

| | | | |
|---|---|---|---|
| JP | 2003035153 A | | 2/2003 |
| JP | 3489332 | * | 1/2004 |
| JP | 3489332 B2 | | 1/2004 |
| WO | 2009031940 A1 | | 8/2009 |
| WO | 2009106159 A1 | | 9/2009 |

OTHER PUBLICATIONS

European search report for Application No. 11172946.3-2311, Nov. 9, 2011 (4 pages).

European examination report for Application No. 11172946.3-2311, Nov. 28, 2011 (3 pages).

* cited by examiner

Method 1100

```
┌─────────────────────────────┐
│   Providing a kit that includes   │
│  a bearing housing and a fluid jacket │
│             1110            │
└─────────────────────────────┘
              │
              ▼
┌─────────────────────────────┐
│ Determining an operational temperature range │
│  of a turbocharger (e.g., gasoline or diesel) │
│             1120            │
└─────────────────────────────┘
              │
              ▼
┌─────────────────────────────┐
│ Based on the operational temperature range, │
│ assembling the turbocharger to include the │
│ bearing housing with or without the fluid jacket │
│             1130            │
└─────────────────────────────┘
```

Fig. 11

TURBOCHARGER BEARING HOUSING ASSEMBLY

TECHNICAL FIELD

Subject matter disclosed herein relates generally to turbomachinery for internal combustion engines and, in particular, to bearing housings.

BACKGROUND

Many conventional turbochargers include relatively massive cast center housings that include lubricant paths for bearing system lubrication and fluid coolant paths for heat extraction. The mass required to support these paths increases retention of heat by the housing and reduces the effectiveness of air flow as a means for cooling the housing. For example, the bearing portion of the housing (e.g., bore for receipt of a bearing or bearing system) is typically located centrally and interiorly and surrounded by material that forms the lubricant and fluid coolant paths. In such an example, air flow only passes by outer surfaces of the housing, which are at a distance from the bearing portion. Further, sand casting of interior coolant paths, especially for intricate paths, can complicate manufacture and raise quality control issues.

During operation, a turbine of a turbocharger is submitted to high gas temperatures; noting that temperatures are typically higher for gasoline engines compared to diesel engines. As a turbine housing transfers the exhaust heat to the center housing, the risk of bearing lubricant coking increases (e.g., consider oil as a lubricant). As mentioned, many conventional turbochargers rely, at least in part, on a fluid cooled center housing with embedded coolant paths. For types of turbochargers or applications that operate at lower temperatures, conventional center housings that rely solely on air and lubricant flow for cooling may suffice. Given lower temperature operation, the cost of fluid cooling in addition to air and lubricant cooling may not be justifiable.

In reality, operating temperatures of a turbocharger vary along a spectrum and can depend on many factors, which may vary during operation (e.g., demand, duration of operation, combustion conditions, external air temperature, temperature of lubricant or cooling fluid, etc.). Conventional approaches that categorize operation as "high temperature" or as "low temperature" and then select a high temperature turbocharger or a low temperature turbocharger depending on temperature category add significant costs. First, a decision must be made as to which category applies and, second, a turbocharger must be selected based on the category. For a given temperature spectrum, while the selected turbocharger may be a "good" fit, it may not be the optimal fit.

As described herein, various assemblies offer solutions to the existing conventional paradigm of "high" and "low" temperature turbochargers. In various examples, an assembly may include a center housing configured for lubricant and air flow cooling or optionally include a fluid jacket that provides, additionally, for fluid cooling. Other examples are also described.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIG. 11 is a diagram of a method for assembling a turbocharger from a kit.

DETAILED DESCRIPTION

Figure 1:
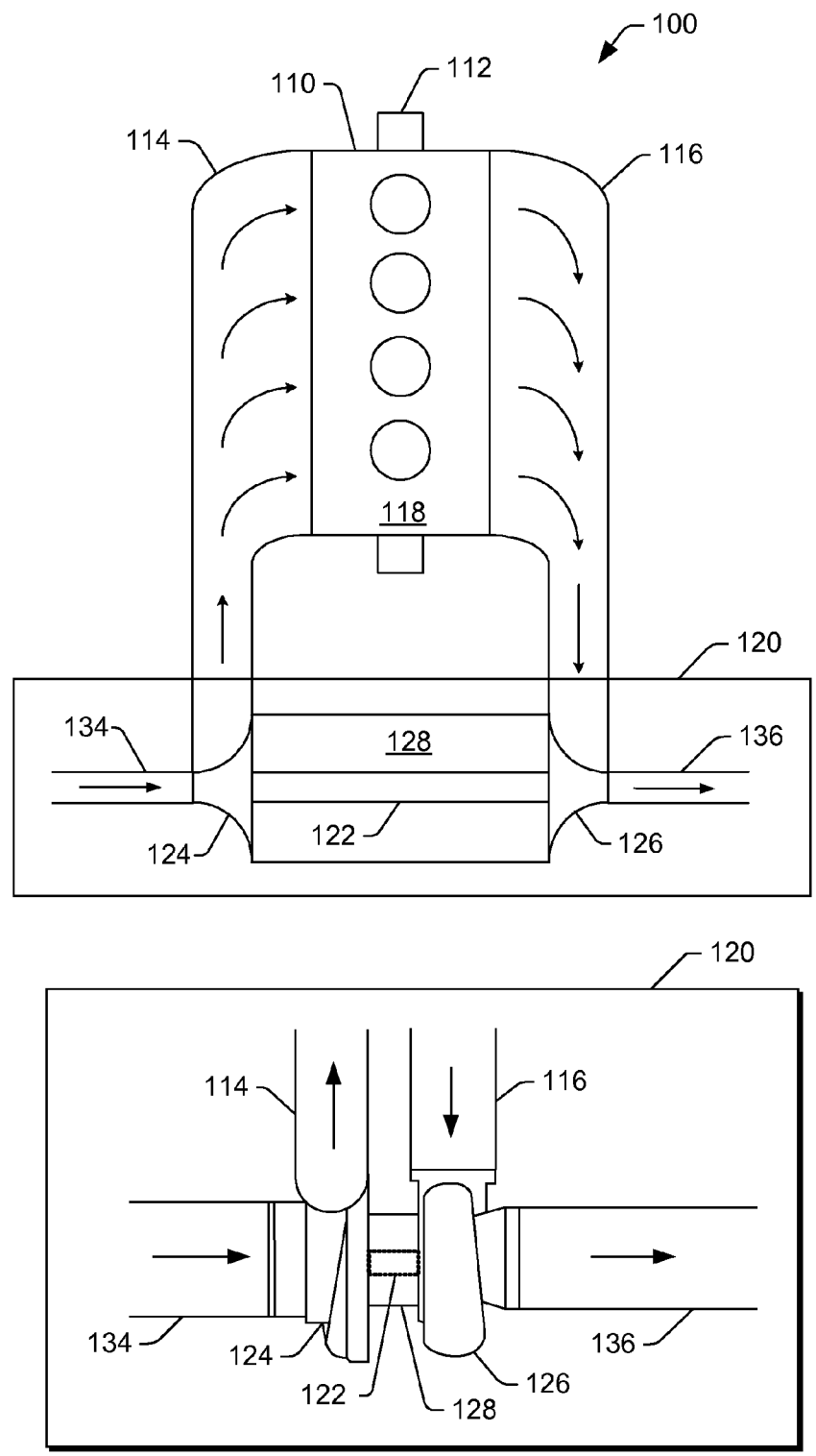
FIG. 1 is a diagram of a turbocharger and an internal combustion engine.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

As described herein, a center housing can be suitable for use where lubricant and air cooling suffice and optionally fitted with a fluid jacket where additional cooling is required or desired. Such an approach can reduce part diversity as the same center housing may be suited for both "high" and "low" temperature operation. As such a center housing is suitable for more types of applications, the associated increase in production volume, logically, offers an opportunity for reduced costs of manufacture. Further, where a fluid jacket is provided as a separate component for installation on a center housing, for a sand cast center housing, issues related to sand casting of fluid coolant paths is eliminated.

In various examples described herein, a center housing or, more generally, a bearing housing may be designed and cast in such a way that an external exchange surface can be machined on demand for receipt of an additional fluid jacket, for example, which may be press fit over the machined surface. To enhance heat transfer, surface area shared by the housing and the jacket should be made as large as possible. Further, a fluid jacket may be configured and operated with an inlet and an outlet in such a way that natural thermal circulation of fluid (e.g., water, antifreeze, etc.) occurs (e.g., when oriented with respect to gravity). A fluid jacket may be manufactured, for example, via processes such as hydro forming, pipe bending, stamping and welding, etc. In various examples, a center housing may be suited for both diesel and gasoline applications where the fluid jacket is optional. As gasoline applications, in general, are associated with higher operational temperatures, a gasoline kit may include a center housing and a fluid jacket while a diesel kit includes the center housing without the fluid jacket (noting that some high temperature diesel engines may benefit from a fluid jacket as well).

Figure 2:
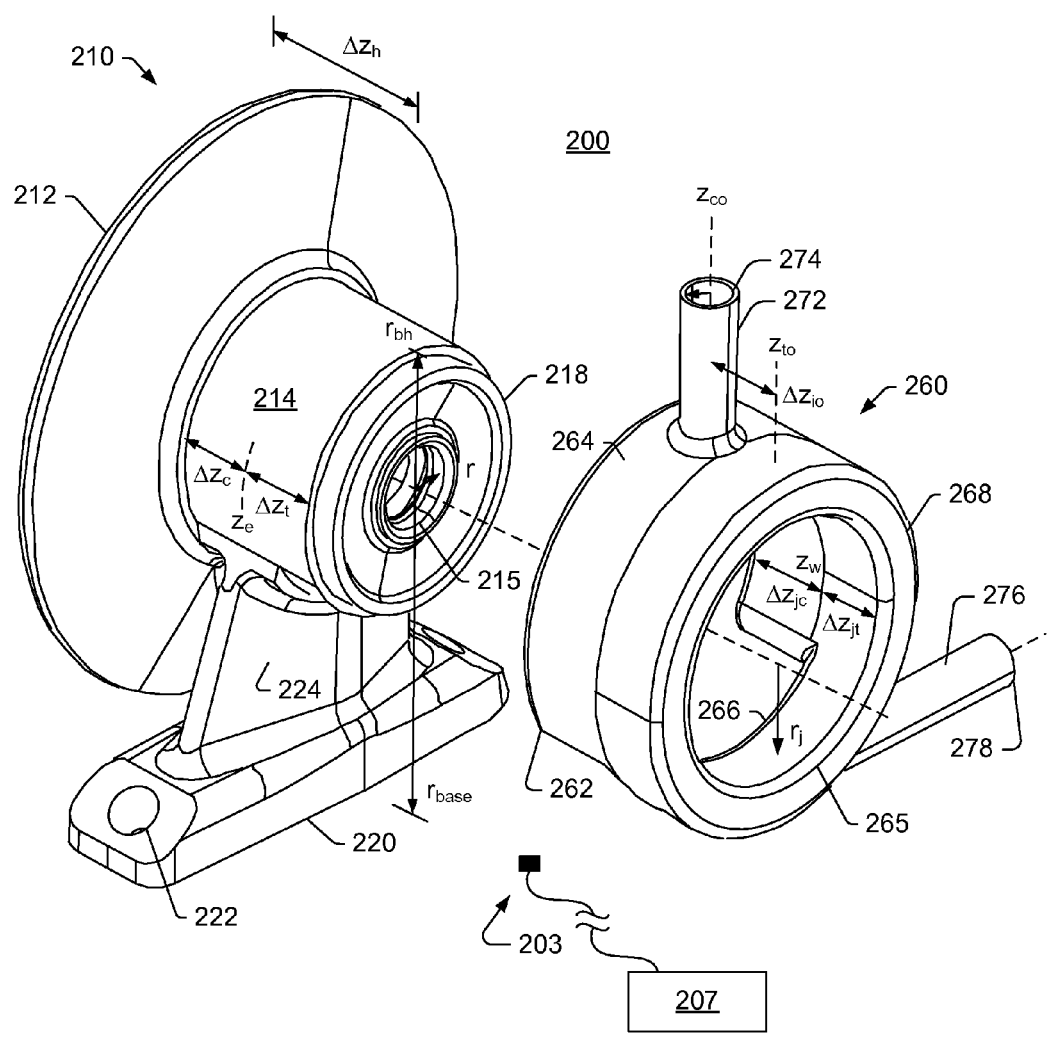
FIG. 2 is a perspective view of an example of an assembly that includes a center housing and an optional fluid jacket.

FIG. 2 shows an example of an assembly 200 that includes a bearing housing 210 and an optional fluid jacket 260. The assembly 200 may be available as a kit that includes the housing 210 optionally with or without the fluid jacket 260.

Figure 5:
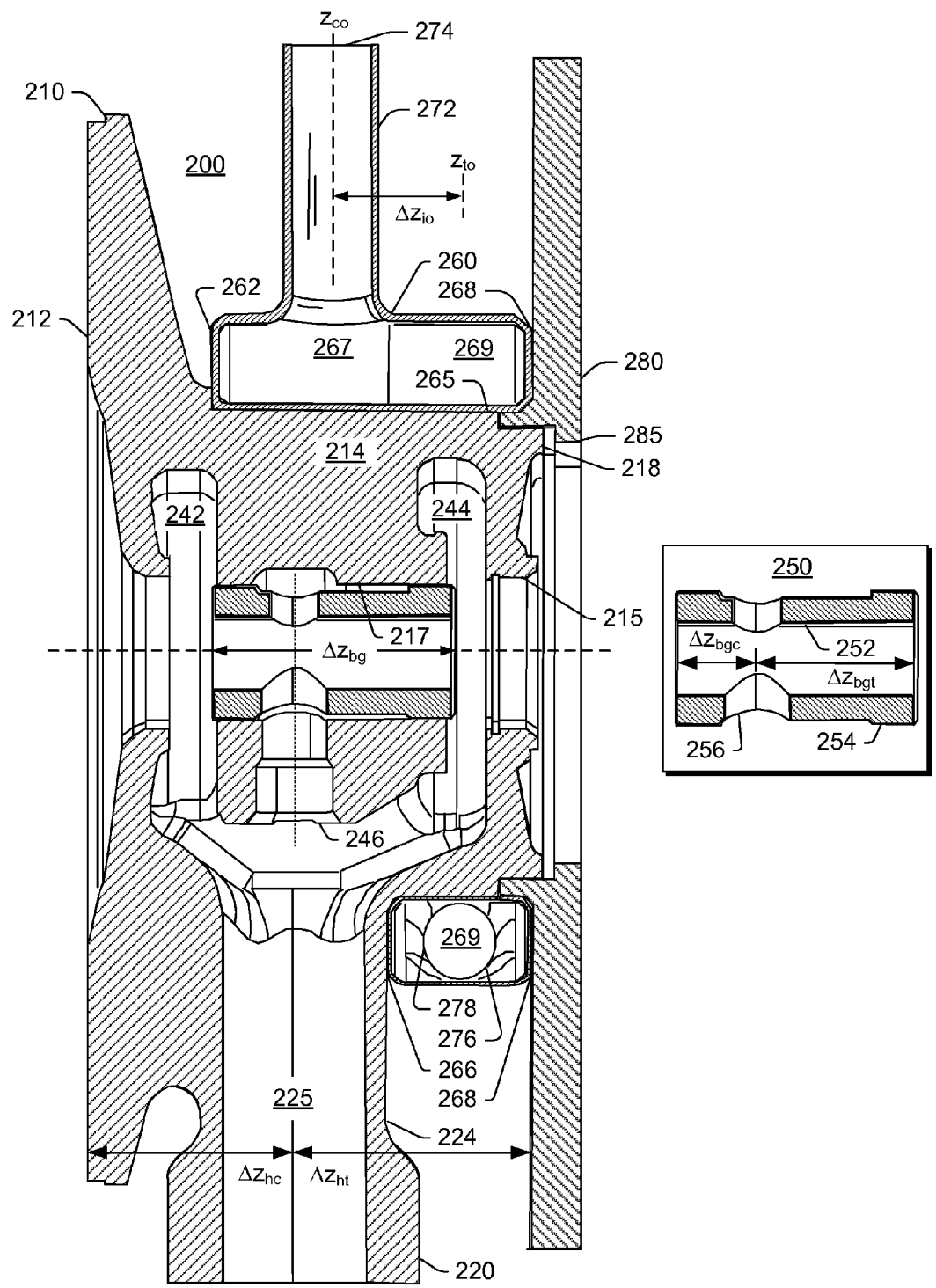
FIG. 5 is a cross-sectional view of the assembly of FIG. 1 with a bearing disposed in a bore of the center housing.
Figure 6:
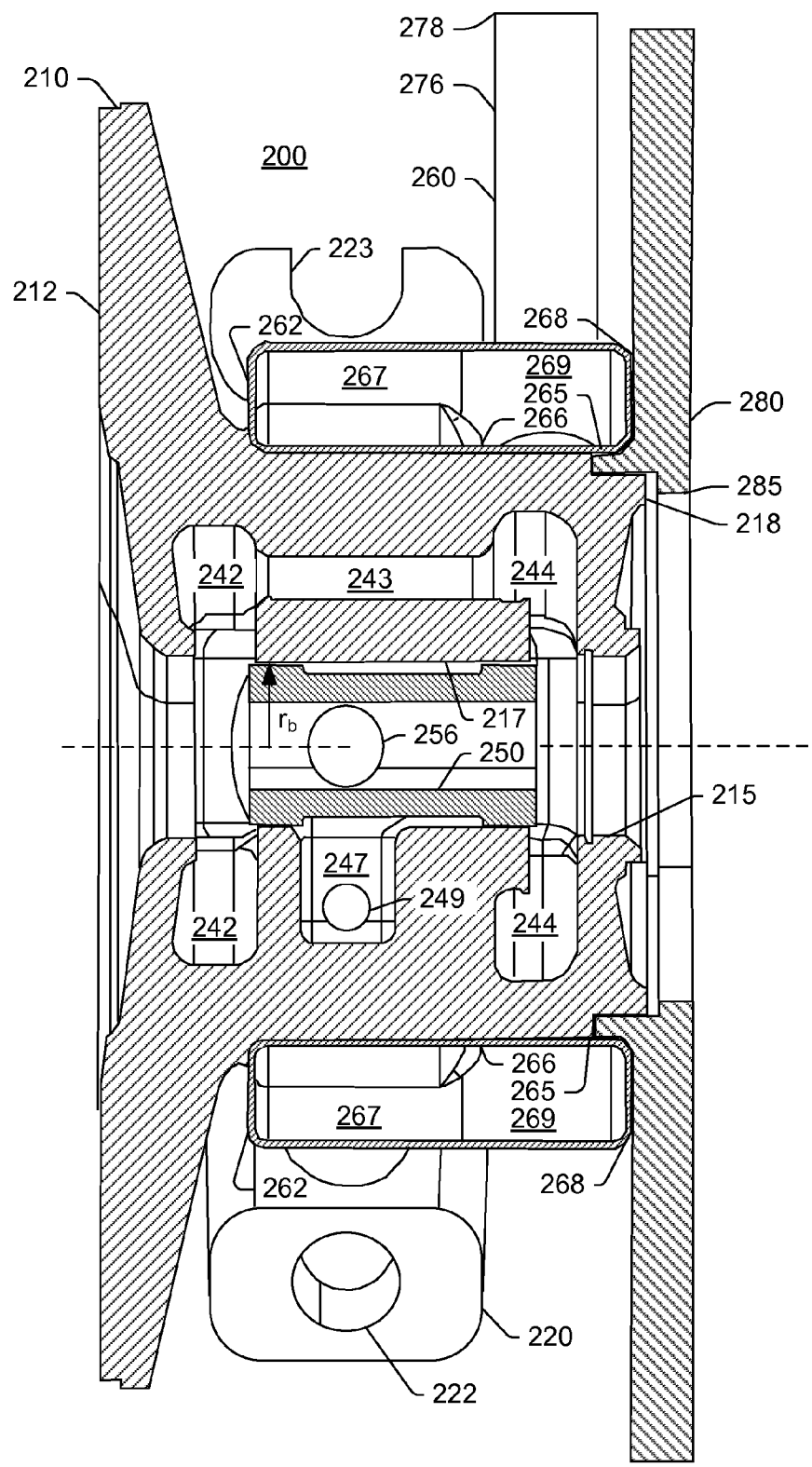
FIG. 6 is another cross-sectional view of the assembly of FIG. 1 with a bearing disposed in a bore of the center housing.

As shown in FIG. 2, the housing 210 includes a cylindrical portion 214 disposed between a compressor fitting 212 and a turbine fitting 218 where a through bore 215 having one or more radii (r) spans the axial length of the housing 210 ($\Delta z_h$). A base 220 connects to the cylindrical portion 214 via an extension 224. As shown, the cylindrical portion 214 has an outer surface at a bearing housing radius ($r_{bh}$) and the base 220 has a planar surface at a base radius ($r_{base}$). In the example of FIG. 2, the base 220 includes an aperture 222 configured for receipt of a bolt or other component to attach the housing 210 to, for example, an engine, brace, etc.; noting that the base 220 may include one or more other attachment features. As shown in FIGS. 5 and 6, the base 220 includes one or more lubricant flow paths for flow of lubricant for lubricating a bearing seated in the bore 215.

In the example of FIG. 2, the cylindrical portion 214 can be defined by a compressor length ($\Delta z_c$) and a turbine length ($\Delta z_t$), for example, separated by an axial position or plane of the extension 224 ($z_e$). In the assembly 200, the fluid jacket 260 is received by the housing 210 via a turbine end of the housing 210 (e.g., the end with the turbine fitting 218). The fluid jacket 260 has a bore 265 with a bore radius $r_j$ (e.g., approximately equal to the radius $r_{bh}$ of the cylindrical portion 214 of housing 210) and a recessed wall 266 configured to accommodate the extension 224 of the housing 210. In the example of FIG. 2, the recessed wall 266 allows the fluid jacket 260 to extend at least partially over the compressor length ($\Delta z_c$) of the cylindrical portion 214 of the housing 210 and thereby allow for fluid contained in the fluid jacket 260 to transfer heat from or to at least a portion of the compressor length ($\Delta z_c$) of the housing 210.

In the example of FIG. 2, the fluid jacket 260 includes a hollow cylindrical wall 264 with a bore 265 that extend between a compressor end 262 and a turbine end 268. The bore 265 is configured to be seated over the cylindrical portion 214 of the housing 210 where the recessed wall 266 is configured to accommodate the extension 224 of the housing 210. The cylindrical portion 264 of the fluid jacket 260 may be defined with respect to a compressor length ($\Delta z_{jc}$) and a turbine length ($\Delta z_{jt}$) separated by an axial position of the recessed wall 266 ($z_w$).

In the example of FIG. 2, one conduit 272 having an opening 274 extends from an axial position ($z_{co}$) along the compressor length ($\Delta z_{jc}$) of the cylindrical wall 264 and another conduit 276 having an opening 278 extends from an axial position ($z_{to}$) along the turbine length ($\Delta z_{jt}$) of the cylindrical wall 264. The openings 274 and 278 may operate as an inlet and an outlet or an outlet and an inlet for the fluid jacket 260. The offset between the conduits 272 and 276 is defined by an axial distance $\Delta z_{io}$ (e.g., equal to $|z_{co}-z_{to}|$).

In a particular example for cooling the bearing housing 210, the opening 278 is an inlet for cooling fluid such that cooler fluid is introduced to the turbine side 268 of the fluid jacket 260, which acts to increase the temperature differential and consequently the driving force for heat transfer between the cooling fluid and a turbine attached to the turbine fitting 218 of the housing 210.

As described herein, the fluid jacket 260 may be used to remove or add heat to a bearing housing. For example, in a cold climate, fluid may be circulated to the fluid jacket 260 to pre-heat a bearing housing. Such a fluid may have a viscosity that is less than lubricant for lubricating a bearing seated in the bearing housing. For example, where external temperature is −20° C., the lubricant may have a high viscosity whereas the viscosity of the fluid for circulating in a fluid jacket may be much lower. In such an example, the fluid may be readily heated and circulated to the fluid jacket to heat the bearing housing as well as any residual lubricant therein. As described herein, pre-heating may act to extend useful life of a bearing system. With respect to cooling, fluid may be circulated to a fluid jacket before, during or after operation. For example, after operation, fluid may be circulated to a fluid jacket to remove heat from a bearing housing.

As shown in FIG. 2, the fluid jacket 260 or, more generally, the assembly 200 may optionally be fitted with a temperature sensor 203 that provides a signal to a controller 207 (e.g., an ECU or other controller with at least a processor, memory and control logic) to aid in control of fluid flow to the fluid jacket as well as providing heat to the fluid (e.g., an electrical heater) or removing heat from the fluid (e.g., via a heat exchanger such as a radiator and fan assembly).

Figure 3:
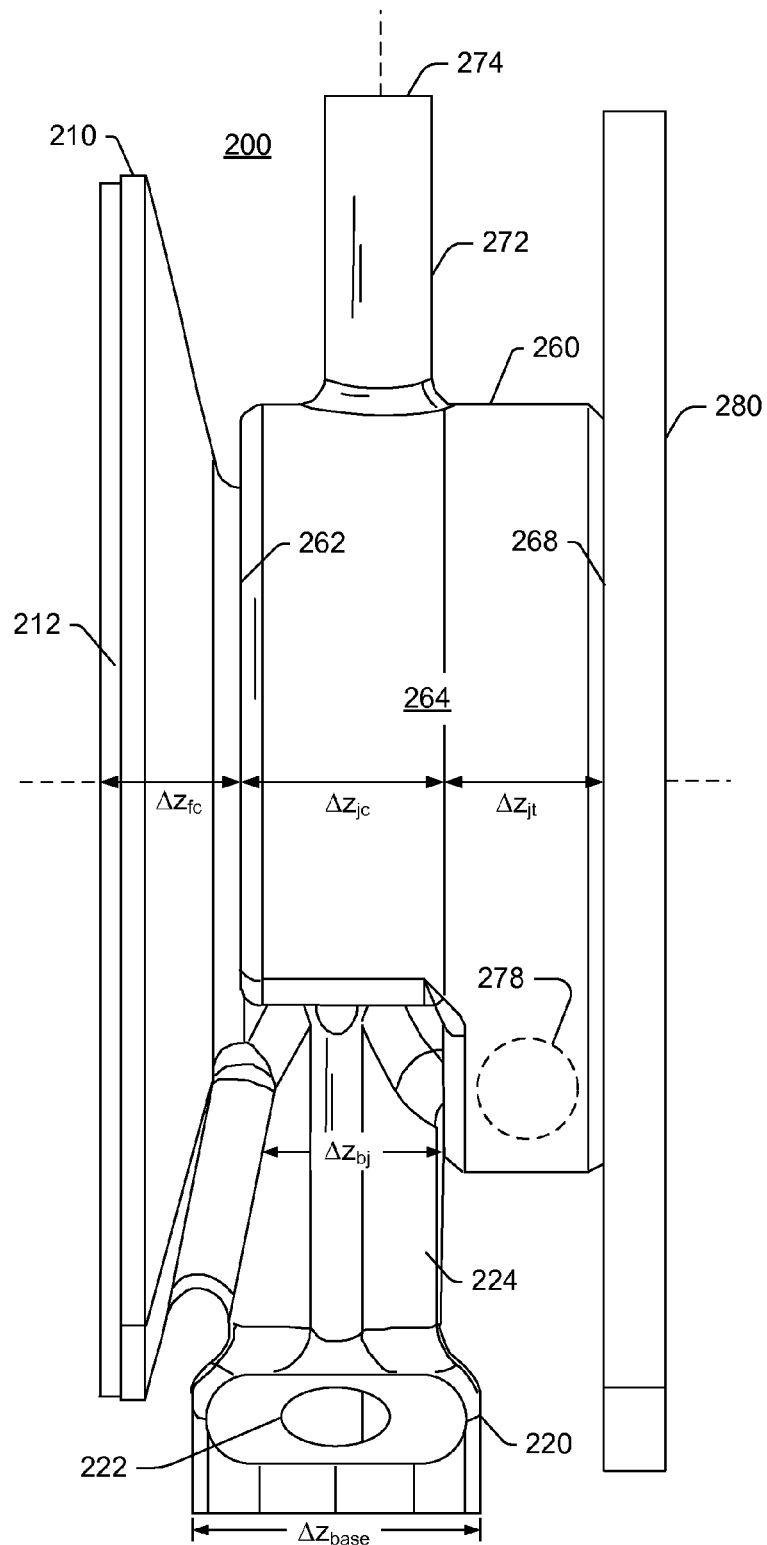
FIG. 3 is a side view of the assembly of FIG. 2 with an attached turbine plate.
Figure 4:
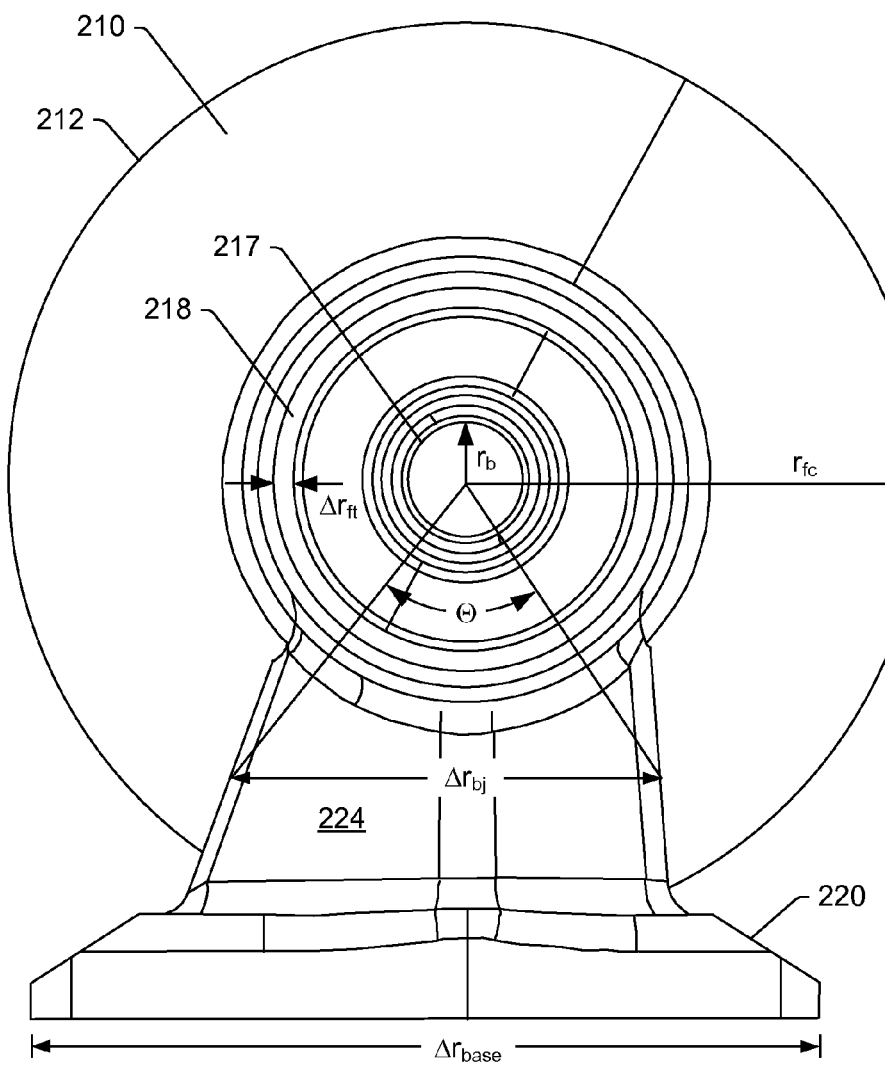
FIG. 4 is an end view of the center housing of FIGS. 2 and 3.

FIG. 3 shows a side view of the assembly 200 of FIG. 2 with a turbine plate 280 fitted to the turbine fitting 218 of the housing 210. As shown in FIG. 3, the base 220 has an axial width ($\Delta z_{base}$) as does the compressor fitting 212 ($\Delta z_{fc}$) while the base extension 224 has a base width $\Delta z_{bi}$ (that may be defined in part by an angle $\Theta$ about a central axis of a bearing bore 217 as shown in FIG. 4). In the example of FIG. 3, the fluid jacket 260 is disposed between the compressor fitting 212 and the turbine plate 280 where the turbine end 268 of the fluid jacket 260 is in contact with the turbine plate 280. Such an arrangement promotes heat transfer between the turbine plate 280 and the fluid jacket 260; noting that during operation, an exhaust turbine is a significant source of heat. In the arrangement of FIG. 3, cooling of the turbine plate 280 does not have any significant impact on efficiency of the turbine yet bearing performance can be enhanced, for example, by reducing lubricant cooling requirements, reducing lubricant temperature, reducing risk of lubricant coking, etc.

FIG. 4 shows an end view of the bearing housing 210 of FIG. 2 along with various dimensions. As described herein, various components may be shown with respect to a cylindrical coordinate system having an axial "z" coordinate, a radial "r" coordinate and an azimuthal "$\Theta$" coordinate (see, e.g., Beyer, W. H., *CRC Standard Mathematical Tables*, 28th ed. Boca Raton, Fla.: CRC Press, p. 212, 1987).

In the example of FIG. 4, the base 220 has a base length $\Delta r_{base}$, the base extension 224 has a base width $\Delta z_{bj}$ (that may be defined in part by an angle $\Theta$ about a central axis of a bearing bore 217), the compressor fitting 212 has an outer radius $r_{fc}$, and the turbine fitting 218 has an edge width $\Delta r_{ft}$. As mentioned, a fluid jacket may be configured to accommodate an extension of a housing. For example, a fluid jacket may have a recessed wall or cutout portion configured to accommodate the extension 224 along an arc length defined by an angle $\Theta$ about a central axis of the bearing bore 217. In such an example, the arc length may correspond to a width of the extension 224 such as the width $\Delta r_{bj}$ shown in FIG. 4.

FIG. 5 shows a cross-sectional view of the assembly 200 of FIG. 2 along with the turbine plate 280 and a bearing 250 positioned in the bearing bore 217 of the housing 210. In the example of FIG. 5, the bearing 250 has an axial length ($\Delta z_{bg}$) and is asymmetric in that a cross-bore 256 is offset toward a compressor end of the bearing 250. Specifically, the bearing 250 has a compressor side length ($\Delta z_{bgc}$) and a turbine side length ($\Delta z_{bgt}$) defined by the axis of the cross-bore 256. As shown, the bearing 250 includes an inner surface 252 and an outer surface 254. The inner surface 252 is configured to act as a journal surface with a shaft and the outer surface 254 is configured to be received by the bearing bore 217 of the housing 210.

As shown in FIG. 5, the housing 210 includes various internal paths such as the lubricant path formed by a bore 225 (which may also provide access to a locating pin (not shown) seated in a locating pin receptacle 246) that bifurcates to a compressor side path 242 and a turbine side path 244. FIG. 5 also shows the through bore 215 as having various radii, including one or more bearing bore radii (see, e.g., the bearing bore 217).

In the example of FIG. 5, the housing 210 includes a compressor side length ($\Delta z_{hc}$) and a turbine side length ($\Delta z_{ht}$) defined by the axis of the bore 225. As described herein, the axial position of the bore 225, as shifted toward the compressor end 212 and away from the turbine end 218 allows the fluid jacket 260 to contact a larger portion of the turbine side of the housing 210.

FIG. 5 also shows various internal chambers of the fluid jacket 260 such as a compressor side chamber 267 and a turbine side chamber 269. As shown, the turbine side chamber 269 of the fluid jacket 260 extends 360 degrees about the cylindrical portion 214 of the housing 210; whereas, the compressor side chamber 267 is truncated to accommodate the extension 224. With respect to the openings 274 and 278 of the conduits 272 and 276, respectively, the cross-sectional view of FIG. 5 shows the axial offset $\Delta z_{io}$ (e.g., $|z_{co}-z_{to}|$). As mentioned, the axial shift of the path formed by the bore 225 allows for the turbine side chamber 269 to have a larger axial length and hence be in contact with a larger portion of the housing 210. In other words, if the path 225 were centered and a symmetric bearing employed, the amount of space of the turbine side would be limited; noting that the turbine side typically has greater cooling requirements due to exposure to heat transfer from an exhaust turbine.

Where the opening 278 serves as an inlet for fluid to the fluid jacket 260, fluid enters the annular chamber 269 subsequently the semi-annular chamber 267. Where the assembly 200 is oriented with respect to gravity, acceleration of gravity may cause the lower portion of the annular chamber 269 to be filled prior to filling of the semi-annular chamber 267. In such an example, where cooling is performed, the coolest fluid will flow between the extension 224 and the turbine plate 280, which includes an opening defined by a surface 285. Hence, the coolest fluid will be available to remove heat from lubricant flowing in the extension 224 and also available to remove heat from at least a portion of the turbine plate 280. Accordingly, the overall configuration of the example of FIG. 5 aims to strategically enhance cooling while accommodating necessary features of the housing 210 (e.g., the extension 224 which provides for lubricant flow as well as a base for mounting the housing 210). Accordingly, in the example of FIG. 5, various features operate synergistically to provide enhanced heat transfer compared to a conventional housing.

FIG. 6 shows another cross-sectional view of the assembly 200 of FIG. 2 along with the turbine plate 280 and the bearing 250. In the view of FIG. 6, another lubricant path 247 is shown, which is offset from the path formed by the bore 225 of the extension 224 and includes an opening 249. Also, another attachment feature 223 is shown as a semi-circular opening in the base 220 located opposite the opening 222. When FIG. 6 is viewed in conjunction with FIG. 5, the shapes of the chambers 242 and 244 may be more fully appreciated along with a path 243 that links the chambers 242 and 244.

Figure 7:
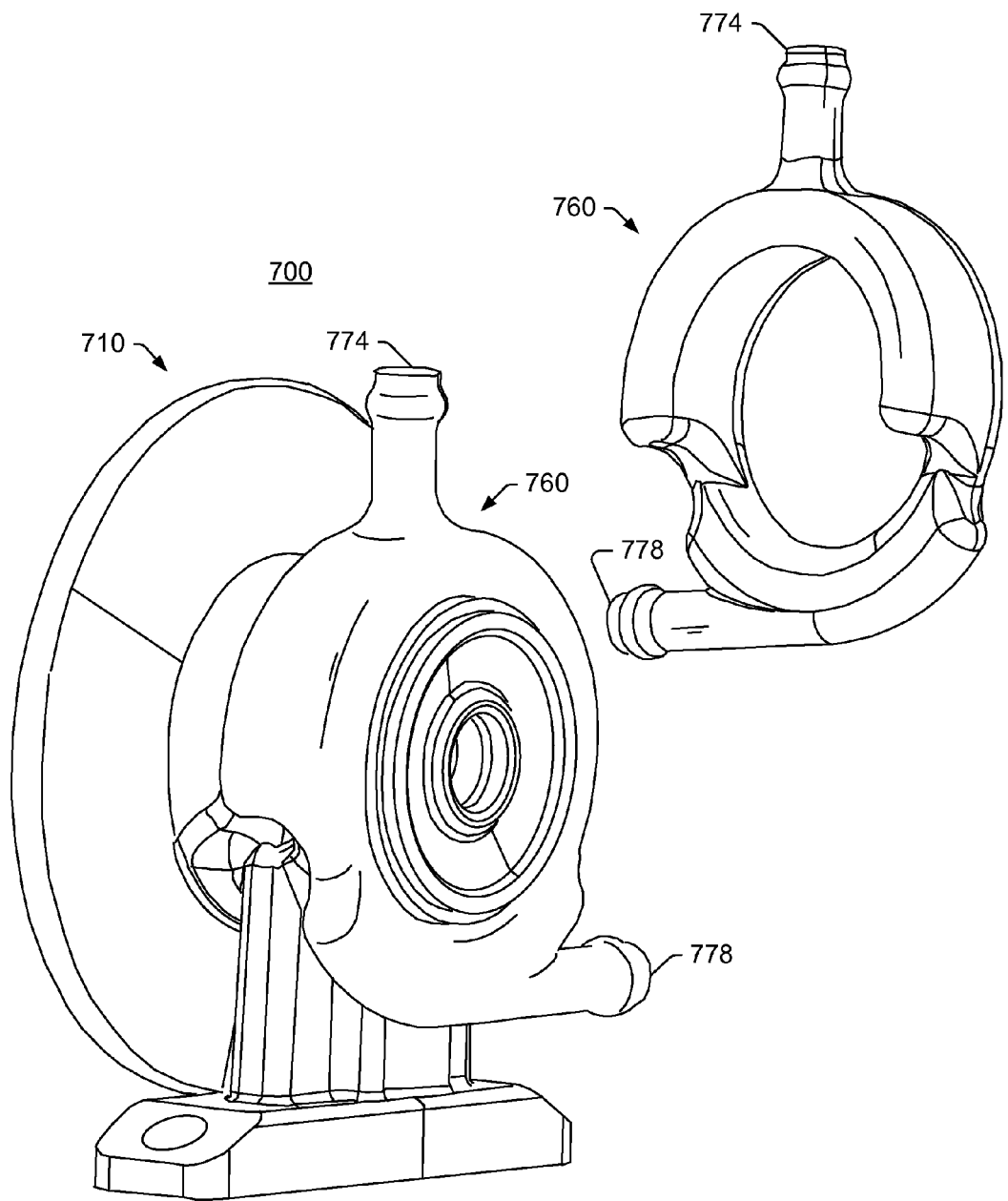
FIG. 7 is a perspective view of an example of an assembly that includes a housing and a fluid jacket.

FIG. 7 shows a perspective view of an assembly 700, which is another example of a housing 710 and optional fluid jacket arrangement 760. In the example of FIG. 7, an opening 778 may be an inlet for fluid such that the coolest fluid enters a portion of the fluid jacket 760 that is disposed between an extension of the housing 710 and a turbine and an opening 774 may be an outlet for fluid.

As shown in FIGS. 2, 3, 5, 6 and 7, an assembly for a turbocharger can include a bearing housing with a cylindrical portion with a bore configured for receipt of a bearing, an extension that extends radially outwardly from the cylindrical portion to a base, the base configured with one or more features for securing the bearing housing to another component (e.g., a engine, a brace, etc.), a compressor fitting, a turbine fitting, and lubricant flow paths; and a fluid jacket that includes a cylindrical wall configured for placement over at least a portion of the cylindrical portion of the bearing housing where the cylindrical wall includes a recess configured to accommodate at least a portion of the extension of the bearing housing, a fluid inlet, and a fluid outlet.

Figure 8:
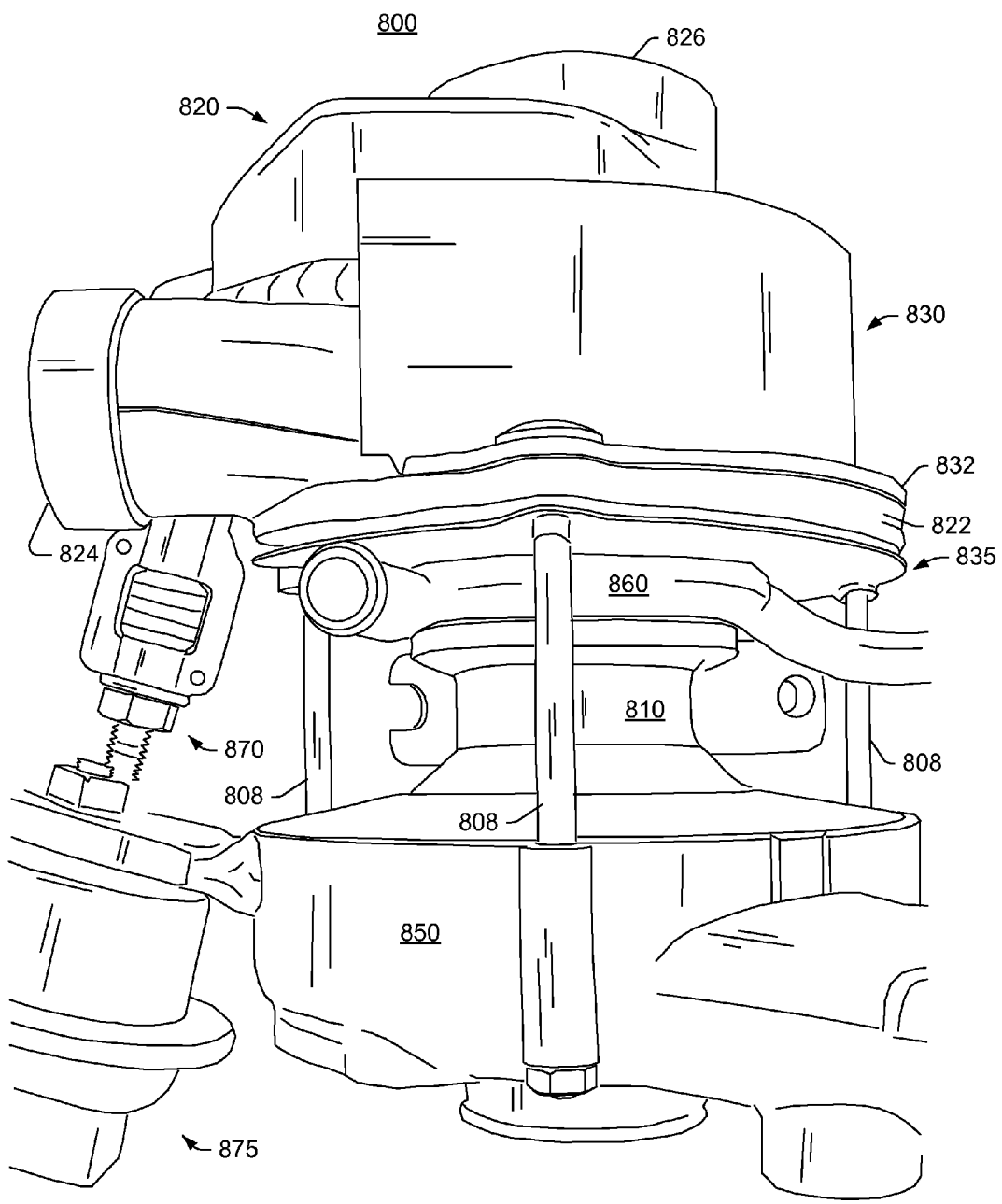
FIG. 8 is a perspective view of an example of a turbocharger assembly that includes a center housing and a fluid jacket.

FIG. 8 shows a perspective view of an assembly 800 that includes a turbine assembly 820 fitted with a burst shield 830, a heat shield 835, a center housing 810, a fluid jacket 860, a compressor assembly 850 and a wastegate control assembly 870 with an actuator 875. In the example of FIG. 8, rods 808 extend from a base 832 of the burst shield 830 to the compressor assembly 1280 and clamp a plate portion 822 of the turbine assembly 820, which includes an exhaust inlet 824 and an exhaust outlet 826. The heat shield 835 allows for the fluid jacket 860 to be mounted without directly contacting the plate portion 822 of the turbine assembly 820. The fluid jacket 860 can allow for flow of a cooling fluid to remove heat from the assembly 800, particularly heat transferred to the heat shield 835 by the turbine assembly 820 (e.g., via the plate portion 822). Further, the plate portion 822 may be configured to connect directly to the housing 810 about a central opening that accommodates a turbine shaft supported by a bearing disposed in the housing 810. In such an arrangement, the fluid jacket 860, along an inner radius, may help extract heat at or near the juncture between the housing 810 and the plate portion 822.

As shown in the example of FIG. 8, the wastegate actuator 875 may be attached, in part, to the compressor assembly 850. A detachment mechanism of the control assembly 870 may allow for disassembly of some components of the actuator 875 such that the rods 808 may be removed and the turbine assembly 820 and other pieces taken apart without detaching the wastegate actuator 875 from the compressor assembly 850.

In the example of FIG. 8, air can flow to the outer surfaces of the center housing 810. This may be, in part, due to the clamping mechanism that relies on the rods 808 and features of the turbine assembly 820 and the compressor assembly 850. For example, the plate portion 822 of the turbine assembly 820 may be a cast component with sufficient rigidity and integrity to support bolts that can be secured to features of the compressor assembly 850 and tightened to secure the center housing 810. Such an approach can act to reduce mass of the center housing 810, yet, the center housing 810 may still be sufficiently rigid to provide a base for mounting the turbocharger to an engine, a brace, etc.

Figure 9:
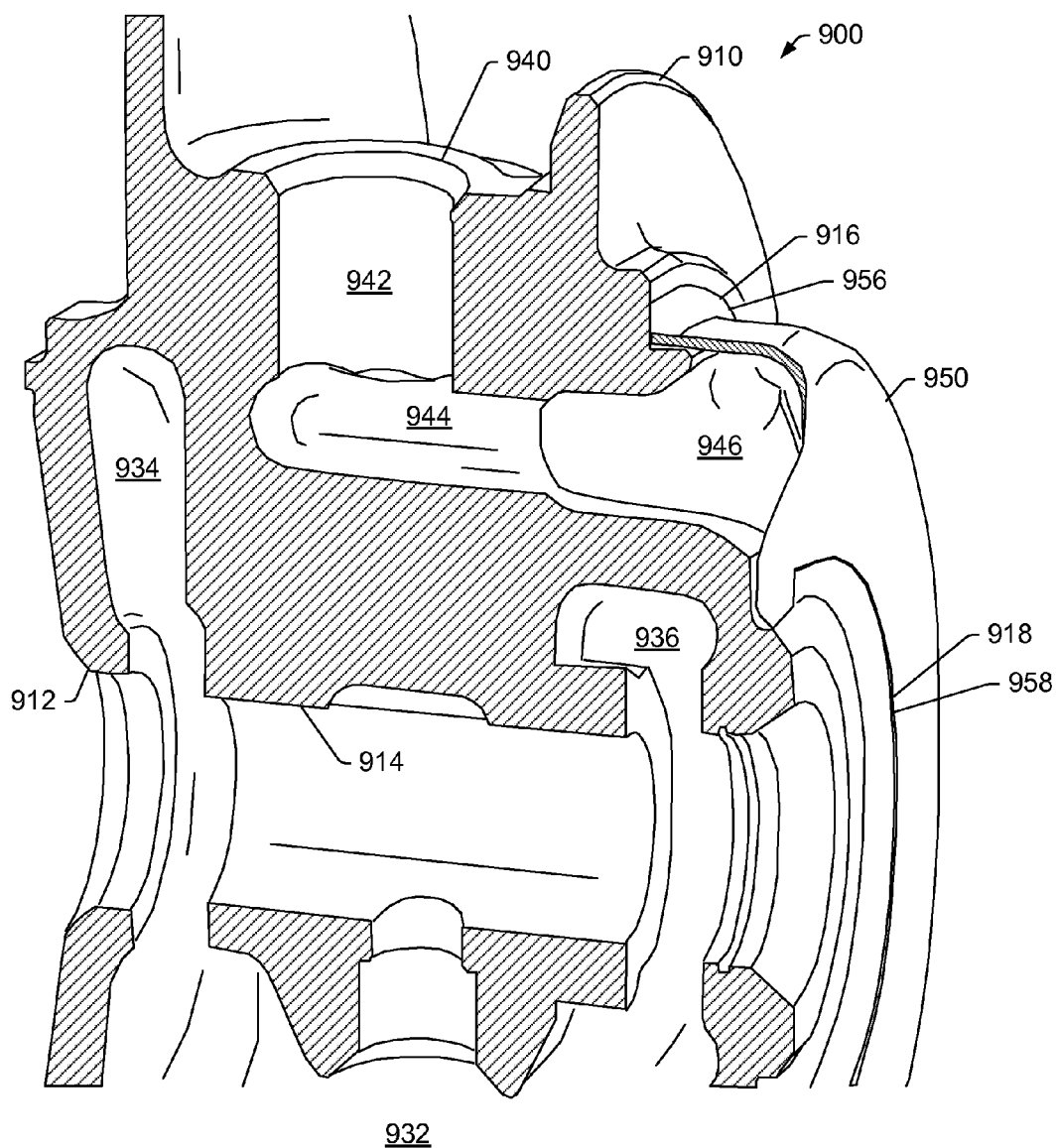
FIG. 9 is a cross-sectional view of a center housing with a turbine end cover to form a fluid chamber.

FIG. 9 shows an example of an assembly 900 that includes a center housing 910 fitted with a turbine end cover 950, which may be press fit, welded or otherwise attached to the center housing 910 to form a fluid tight seal between the housing 910 and the cover 950.

In the example of FIG. 9, the housing 910 includes a compressor end 912, a bearing bore 914, a proximal seal surface 916 and a distal seal surface 918. The cover 950 includes surfaces 956 and 958 that, in combination with the seal surfaces 916 and 918, form fluid tight seals. The housing 910 is shown as including lubricant (e.g., oil) chambers or passages 932, 934 and 936 and as including fluid inlet 940 for fluid communication with one or more chambers or passages 942, 944 and 946. The chamber 946 is formed between the housing 910 and the cover 950.

In the example of FIG. 9, the cover 950 allows for heat transfer to or from the fluid. For example, during operation, heat generated by a turbine assembly fitted to the center housing 910 may be transferred to fluid in the fluid chamber 946 via the cover 950. Fluid flow in the chamber 950 may extract heat and thereby reduce heat transfer to a bearing system. Such an arrangement can reduce the heat transfer load of the lubricant and thereby enhance lubricant performance.

Figure 10:
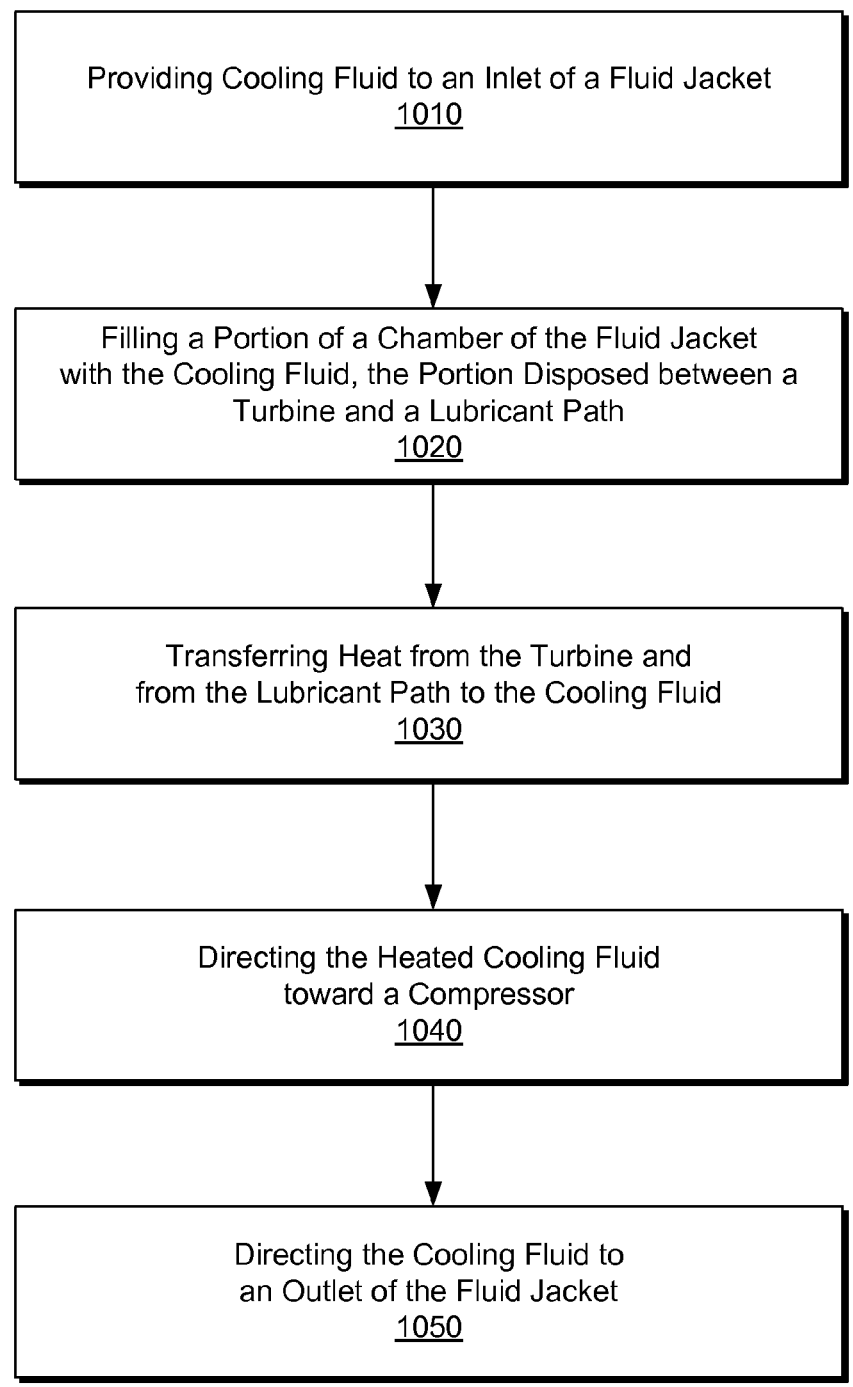
FIG. 10 is a diagram of a method for cooling a center housing and a turbine assembly.

FIG. 10 shows a block diagram of a method 1000 for removing heat from a turbine and a lubricant path for lubrication of a bearing disposed in a center housing of a turbocharger. In a provision block 1010, the method 1000 includes providing cooling fluid to an inlet of a fluid jacket. A filling block 1020 includes filling a portion of a chamber of the fluid jacket with the cooling fluid where the portion of the chamber is disposed between a turbine and a lubricant path for lubricant to lubricate a bearing disposed in the center housing. A transference block 1030 includes transferring heat from the turbine and the lubricant path to the cooling fluid in the portion of the chamber. A direction block 1040 includes directing the heated cooling fluid toward a compressor (e.g., a compressor attached to the center housing). And, another direction block 1050 includes directing the cooling fluid to an exit of the fluid jacket.

FIG. 11 shows a block diagram of a method for assembling a turbocharger, in part, based on a kit. In a provision block 1110, the method 1100 includes providing a kit that includes a bearing housing and a fluid jacket. A determination block 1120 includes determining an operational temperature range of a turbocharger. An assembly block 1130 includes, based on the operational temperature range, assembling the turbocharger to include the bearing housing with or without the fluid jacket. For example, in the method 1100, where the operational temperature range corresponds to a gasoline engine, the assembling can include the fluid jacket; whereas, where the operational temperature range corresponds to a diesel engine, the assembling need not include the fluid jacket. Accordingly, the kit may be suited for various operational temperature ranges. In some instances, a high temperature diesel engine may have an operational temperature range that overlaps with a gasoline engine. Typical diesel exhaust may vary from about 100 C at idle to about 500 C at high load. For a gasoline engine, exhaust temperature may, at an upper end, exceed 1000 C.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. An assembly for a turbocharger comprising:
 a bearing housing that comprises
  a cylindrical portion that comprises an exterior surface and an internal bore configured for receipt of a bearing,
  an extension that extends radially outwardly from the cylindrical portion to a base, the base configured with one or more features for securing the bearing housing to another component,
  a compressor fitting,
  a turbine fitting, and
  lubricant flow paths; and
 a fluid jacket that comprises
  a cylindrical wall configured for placement over at least a portion of the exterior surface of the cylindrical portion of the bearing housing wherein the cylindrical wall comprises a recess configured to accommodate at least a portion of the extension of the bearing housing,
  a fluid inlet,
  a fluid outlet, and
  fluid flow paths in fluid communication with the fluid inlet and the fluid outlet, wherein the lubricant flow paths of the assembly are confined to the bearing housing and wherein the fluid flow paths of the assembly are confined to the fluid jacket.

2. The assembly of claim 1 wherein the extension comprises one or more lubricant flow paths.

3. The assembly of claim 1 wherein, along an axis of the cylindrical wall, an axial offset exists between the fluid inlet and the fluid outlet.

4. The assembly of claim 1 wherein the recess of the cylindrical wall defines a semi-annular chamber adjacent to an annular chamber.

5. The assembly of claim 4 wherein the annular chamber comprises a portion disposed between one of the lubricant flow paths and a turbine component fitted to the turbine fitting.

6. The assembly of claim 5 wherein the fluid inlet of the fluid jacket directs fluid to the portion of the annular chamber that is disposed between one of the lubricant flow paths and the turbine component fitted to the turbine fitting.

7. The assembly of claim 4 wherein the fluid inlet directs fluid to the annular chamber and the semi-annular chamber directs fluid to the fluid outlet.

8. The assembly of claim 1 further comprising a compressor assembly fitted to the compressor fitting and a turbine assembly fitted to the turbine fitting.

9. The assembly of claim 8 wherein rods connect the compressor assembly and the turbine assembly and clamp the bearing housing therebetween.

10. The assembly of claim 8 further comprising a heat shield disposed adjacent to the turbine assembly.

11. The assembly of claim 1 wherein the base provides for orientation of the fluid inlet and the fluid outlet with respect to a direction of gravity to provide for fluid flow due to natural convection in the fluid jacket to assist flow from the fluid inlet to the fluid outlet.

12. The assembly of claim 1 wherein the bearing housing comprises a lubricant flow path that bifurcates to a compressor side lubricant flow path and a turbine side lubricant flow path.

13. The assembly of claim 1 wherein the bore comprises a locating pin receptacle configured for receipt of a locating pin to at least axially locate the bearing in the bore.

14. The assembly of claim 13 further comprising the bearing wherein the bearing comprises a cross-bore configured for receipt of the locating pin wherein the cross-bore is offset from a centerline of the bearing.

15. The assembly of claim 1 further comprising a temperature sensor.

16. A method comprising:
providing an assembly that comprises
a bearing housing that comprises
a cylindrical portion that comprises an exterior surface and an internal bore configured for receipt of a bearing,
an extension that extends radially outwardly from the cylindrical portion to a base, the base configured with one or more features for securing the bearing housing to another component,
a compressor fitting,
a turbine fitting, and
lubricant flow paths;
a fluid jacket that comprises
a cylindrical wall that is placed over at least a portion of the exterior surface of the cylindrical portion of the bearing housing wherein the cylindrical wall comprises a recess that accommodates at least a portion of the extension of the bearing housing,
a fluid inlet,
a fluid outlet, and
fluid flow paths in fluid communication with the fluid inlet and the fluid outlet, wherein the lubricant flow paths of the assembly are confined to the bearing housing and wherein the fluid flow paths of the assembly are confined to the fluid jacket; and
a turbine plate fit to the turbine fitting of the bearing housing;
providing cooling fluid to the fluid inlet of the fluid jacket;
filling a portion of a chamber of the fluid jacket with the cooling fluid, the portion disposed between the turbine plate and a lubricant path of the bearing housing;
transferring heat from the turbine plate and from the lubricant path to the cooling fluid;
directing the heated cooling fluid toward the compressor fitting; and
directing the cooling fluid to the fluid outlet of the fluid jacket.

17. The method of claim 16 wherein the coolest fluid fills the portion of the chamber disposed between the turbine plate and the lubricant path of the bearing housing.

18. A method comprising:
providing a kit that comprises a bearing housing and a fluid jacket wherein the bearing housing comprises a cylindrical portion that comprises an exterior surface and an internal bore configured for receipt of a bearing, an extension that extends radially outwardly from the cylindrical portion to a base, the base configured with one or more features for securing the bearing housing to another component, a compressor fitting, a turbine fitting, and lubricant flow paths and wherein the fluid jacket comprises a cylindrical wall configured for placement over at least a portion of the exterior surface of the cylindrical portion of the bearing housing wherein the cylindrical wall comprises a recess configured to accommodate at least a portion of the extension of the bearing housing, a fluid inlet, a fluid outlet, and fluid flow paths in fluid communication with the fluid inlet and the fluid outlet, wherein the lubricant flow paths of the assembly are confined to the bearing housing and wherein the fluid flow paths of the assembly are confined to the fluid jacket;
determining an operational temperature range of a turbocharger; and
based on the operational temperature range, assembling the turbocharger to include the bearing housing with or without the fluid jacket.

19. The method of claim 18 wherein the operational temperature range corresponds to a gasoline engine and the assembling includes the fluid jacket.

20. The method of claim 18 wherein the operational temperature range corresponds to a diesel engine and the assembling does not include the fluid jacket.

* * * * *